US008465362B2

(12) United States Patent
Jackson

(10) Patent No.: US 8,465,362 B2
(45) Date of Patent: Jun. 18, 2013

(54) DOUBLE TIME-BASED BONUS METHOD AND APPARATUS FOR GAMING MACHINES

(75) Inventor: Kathleen Nylund Jackson, Scituate, MA (US)

(73) Assignee: Precedent Gaming, Inc., Scituate, MA (US)

( * ) Notice: Subject to any disclaimer, the term of this patent is extended or adjusted under 35 U.S.C. 154(b) by 116 days.

(21) Appl. No.: 13/066,496

(22) Filed: Apr. 15, 2011

(65) Prior Publication Data

US 2011/0269530 A1 Nov. 3, 2011

Related U.S. Application Data

(60) Provisional application No. 61/343,375, filed on Apr. 28, 2010.

(51) Int. Cl.
*A63F 9/24* (2006.01)
*A63F 13/00* (2006.01)

(52) U.S. Cl.
USPC .................. 463/25; 463/16; 463/17; 463/20; 463/22; 463/26

(58) Field of Classification Search
USPC ............................................. 463/16, 20, 25
See application file for complete search history.

(56) References Cited

U.S. PATENT DOCUMENTS

| | | | | |
|---|---|---|---|---|
| 6,190,255 | B1 | 2/2001 | Thomas et al. | |
| 6,364,768 | B1 * | 4/2002 | Acres et al. | 463/25 |
| 6,506,118 | B1 * | 1/2003 | Baerlocher et al. | 463/25 |
| 6,554,704 | B2 * | 4/2003 | Nicastro et al. | 463/20 |
| 6,942,566 | B2 * | 9/2005 | Baerlocher et al. | 463/16 |
| 7,037,195 | B2 | 5/2006 | Schneider et al. | |
| 7,048,628 | B2 * | 5/2006 | Schneider | 463/16 |
| 7,179,166 | B1 * | 2/2007 | Abbott | 463/9 |
| 7,250,001 | B2 | 7/2007 | Baerlocher et al. | |
| 7,258,611 | B2 | 8/2007 | Bigelow, Jr. et al. | |
| 7,364,506 | B2 * | 4/2008 | Jaffe et al. | 463/20 |
| 7,381,134 | B2 | 6/2008 | Cuddy et al. | |
| 7,448,949 | B2 | 11/2008 | Kaminkow et al. | |
| 7,699,697 | B2 * | 4/2010 | Darrah et al. | 463/16 |
| 7,740,534 | B2 | 6/2010 | Walker et al. | |
| 7,794,316 | B2 * | 9/2010 | Palmer et al. | 463/16 |
| 7,976,373 | B2 * | 7/2011 | Kroeckel et al. | 463/16 |
| 2002/0187824 | A1 * | 12/2002 | Vancura | 463/16 |
| 2004/0162132 | A1 * | 8/2004 | Jaffe et al. | 463/20 |
| 2005/0020342 | A1 * | 1/2005 | Palmer et al. | 463/16 |
| 2009/0042641 | A1 | 2/2009 | Anderson et al. | |
| 2009/0048010 | A1 * | 2/2009 | Kroeckel et al. | 463/13 |
| 2010/0009742 | A1 | 1/2010 | Popovich et al. | |
| 2010/0029363 | A1 | 2/2010 | Hoffman et al. | |
| 2010/0029367 | A1 | 2/2010 | Englman et al. | |
| 2010/0041464 | A1 | 2/2010 | Arezina et al. | |
| 2010/0075738 | A1 | 3/2010 | Roukis | |
| 2010/0227667 | A1 | 9/2010 | Englman et al. | |

* cited by examiner

*Primary Examiner* — Steven J Hylinski

(57) ABSTRACT

A method and apparatus of wagered mechanical, electromechanical or video symbol play for individual or networked gaming machines is disclosed. The method comprises a base game, a time-based bonus element scheme that may provide a bonus event, and a time-based window of opportunity in which the bonus element scheme may be accepted by a qualified player. Upon a triggering event in the base game, or alternately a random event, the player is afforded a specific period of time in which to choose a bonus element scheme comprised of at least one but preferably two bonus elements (i.e., cash, credits, casino player points, free spins, multipliers, and the like) that are each available for a predetermined and/or random time interval. The chosen bonus element scheme provides the parameters of a bonus round game.

6 Claims, 9 Drawing Sheets

DOUBLE TIME-BASED BONUS METHOD AND APPARATUS FOR GAMING MACHINES

RELATED APPLICATION DATA

This Application claims priority from U.S. Provisional Patent Application Ser. No. 61/343,375, filed Apr. 28, 2010, and having the Title DOUBLE TIME-BASED BONUS METHOD AND APPARATUS FOR GAMING MACHINES.

BACKGROUND OF THE INVENTION

1. Field of the Invention

The present invention relates to a slot symbol game and apparatus suitable for use in casinos and other gaming enterprises. The invention further relates to mechanical, electromechanical or video gaming play that provides bonus elements for a bonus event that are available for predetermined time intervals, and that may be accepted by a qualified player during a specific allotment of time.

2. Background of the Art

Gaming machines, and in particular slot machine games, have grown exponentially in numbers in the last twenty years, as have the revenues generated by such devices. Since it is estimated that at least 70% of any casino's revenues are now provided by gaming machines, there is increasingly fierce competition among the machine manufacturers to attract and maintain customers with compelling game content.

Slot manufacturers strive to differentiate their machines by adding unique features and methods, and these proprietary innovations are designed to initially attract a player to a particular slot machine and then retain the player's interest for protracted periods of time.

Especially in the last decade, primary or base machine games have been augmented by special features that are particularly popular with the gaming public. One of the most popular features is known in the art as bonus game play. In many cases the awards that may be won in a bonus game are more lucrative than base game pays, so the player is encouraged to play for longer periods until the bonus opportunity is achieved. Bonus game play may consist of certain enhancements to the base game play, such as free spins and multipliers, or it may add a separate bonus game event that either replaces the base game on the screen or is displayed in a second screen. One of the most popular second-screen bonus methods is a "pick-a-window" gameplay as described in U.S. Pat. No. 6,190,255 (Thomas, et al.). The player picks a window that exposes a credit value, and keeps picking until an end-bonus symbol is displayed. The player is then rewarded with the credit values accumulated before the end-bonus symbol is picked. A more recent bonus scheme involves community gaming. Networked machines provide players who qualify for a bonus to participate in a community bonus event. U.S. Pat. No. 7,448,949 (Kaminkow, et al.) teaches a gaming device system in which a plurality of gaming devices are linked by a common bonus event. The bonus device comprises a plurality of sections and values displayed at each section. Upon a triggering of the bonus event, any player eligible to participate in the bonus may achieve an outcome generated from the bonus event including the shared display. When the shared display is activated, it simultaneously generates a separate or individual outcome associated with each of the gaming devices.

Certain prior art has attempted to enhance the known bonus game play.

U.S. Pat. No. 7,037,195 (Schneider, et al.) provides a time-based bonus system that can be pre-configured to award a certain amount of money to players of networked gaming devices over a certain time period. The time-based bonus system may include a variety of networked gaming devices and a method of arranging participation so that each of the variety of gaming devices has appropriate representation in the bonus pool. The amount of bonus money in a bonus pool is pre-determined by a casino or other gaming network operator.

U.S. Pat. No. 7,381,134 (Cuddy, et al.) discloses an apparatus and method for a free spins game including a plurality of reels, an outcome and a plurality of sections associated with the outcome. The gaming device or player activates the reels to indicate a designated symbol combination including at least two section indicator symbols. When a designated symbol combination including the section indicator symbols is indicated on the reels, the gaming device obtains the corresponding section. The gaming device or player continues to activate the reels until there are no free spins remaining in the game or until all of the sections are obtained. The gaming device then provides the outcome to the player.

U.S. Pat. No. 7,258,611 (Bigelow, Jr., et al.) includes an apparatus and method for a bonus game, and particularly a free spin bonus with an incrementing multiplier. The bonus game includes a plurality of reels having a plurality of symbols and multipliers. The gaming device provides a number of free spins to the player at the beginning of the bonus game. The multiplier preferably starts at "1.times." and increases by one after each free spin. Initially, the player spins the reels attempting to obtain a winning symbol combination on the reels. If the player obtains a winning combination, the gaming device provides an award. The award is multiplied by the multiplier and the player receives the multiplied award for that free spin. The player continues to spin the reels until there are no free spins remaining in the bonus game.

U.S. Pat. No. 7,250,001 (Baerlocher, et al.) provides a gaming device having a separately changeable value and multiplier bonus scheme. The bonus scheme begins when a triggering event occurs during normal operation of the gaming device. Initially, the game displays a value and a multiplier to the player, which form an offer. The game enables the player to keep the offer or change either the value or the multiplier. If the player changes either, the game changes the value or multiplier selected by the player, and yields a new offer. In the preferred embodiment of the bonus scheme, the player can keep the new offer or change the value or multiplier and obtain a final new offer. After the player can no longer change the value or multiplier or if at any time the player keeps an offer, the bonus scheme ends by adding the amount of the offer to the player's gaming device credit, and the player resumes normal play.

United States Patent Application No. 20100075738 (Roukis) discloses a method of gaming comprising: conducting a base game; modifying a current value of a feature counter by a random value in response to a designated counter event occurring in the base game; determining whether the current value of the feature counter corresponds to one of a plurality of feature games in response to a feature trigger event occurring; and conducting any feature game to which the current value of the feature counter corresponds.

United States Patent Application No. 20100041464 (Arezina, et al.) teaches a gaming system for playing a wagering game that includes a plurality of gaming machines configured to play a wagering game and to participate in a community-event. A movable member is disposed substantially adjacent to the plurality of gaming machines and is configured to move relative to the plurality of gaining machines from a first position to a second position during a community-event in response to a single triggering event. The movable member is moved relative to the plurality of gaming machines during a community-event to reveal at least one community-event outcome for the community-event.

United States Patent Application No. 20100029367 (Englman, et al.) describes a gaming system for conducting a wagering game that includes a community display for displaying a community game having a plurality of features for determining a community award that is awarded to all players at eligible linked gaming machines. The community game includes selection of a player at an eligible linked gaming machine to interact with the community game to determine the community award. One of the plurality of features includes a community free spin feature that awards free spins of a base wagering game to each player.

United States Patent Application No. 20100029363 (Hoffman, et al.) discloses a communal game that is displayed by a gaming system. A plurality of gaming devices each enable a player to wager on plays of a primary game and determine an eligibility status. The communal game repeatedly generates at least one communal game symbol from a plurality of communal game symbols regardless of whether any player is wagering on plays of a primary game. The communal game triggers a bonus event based on the generated symbols. Any eligible gaming devices may participate in the bonus event. For each eligible gaming device, the gaming system applies at least one symbol or gaming element from the communal game to the primary game of the eligible gaming device. Each eligible gaming device provides an award based on any winning symbol combinations generated by application of the communal game symbol or gaming element.

United States Patent Application No. 20090042641 (Anderson, et al.) discloses a gaming system for playing a wagering game that includes a display and a controller. The display displays a base game of the wagering game in response to receiving a wager input from a player. The controller is coupled to the display and, in response to receiving the wager input, is programmed to increment eligibility time to a counter of bonus-time eligibility. The counter is decremented as real time progresses. If the counter is greater than zero when a bonus game of the wagering game is triggered, the player is allowed to play the bonus game.

Despite the aforementioned prior art, there remains a need to afford players the chance to choose bonus game elements based upon timing and risk. The present invention provides players with timed opportunities in which to pick bonus game elements. An advantage to the present invention is that multiple bonus elements are displayed for predetermined time intervals and the player must try to capture the best potential bonus game elements possible within a designated time frame. The cautious player may choose to accept a modest bonus scheme (5 free spins at 2× pay, for instance), while the riskier player may reject the said modest bonus scheme in order to ultimately have a chance at a more lucrative bonus scheme (10 free spins at 10× pay, for instance). The riskier player's designated time frame of opportunity, however, may decrement to zero before the said lucrative bonus scheme is offered, and he may ultimately have to accept a meager bonus scheme (2 free spins at 1× pay, for example).

SUMMARY OF THE INVENTION

The present invention discloses a method and apparatus of wagered mechanical, electromechanical or video slot gameplay for individual or networked gaming machines that provide a base game, a time-based bonus element scheme that provides the parameters of a bonus event, and a time-based window of opportunity in which the bonus element scheme may be accepted by the player. The base game may be any symbol game, including slots, video poker, keno, bingo and the like, a second type of wagering game such as craps, roulette, blackjack, or baccarat, or even a player skill-based event, trivia game, target shooting event or the like. A bonus element screen is preferably displayed on a screen separate from the base game, being located on either an area of each single machine or above a bank of community gaming machines. The bonus element screen provides at least one but preferably at least two bonus elements (i.e., cash, credits, casino player points, free spins, multipliers, and the like) that are constantly displayed and changeable according to a time interval. Each bonus element is available for random or predetermined time intervals, and changes when its time interval has decremented in real time to zero seconds. Preferably upon a triggering mechanism in the base game (which may be a predetermined game event or a random event), the player is afforded a specific period of time in which to choose a bonus element scheme that will activate and/or determine the bonus round and the game played in the bonus event, where an option in the type of bonus event may be offered.

DETAILED DESCRIPTION OF THE INVENTION

Figure 1:
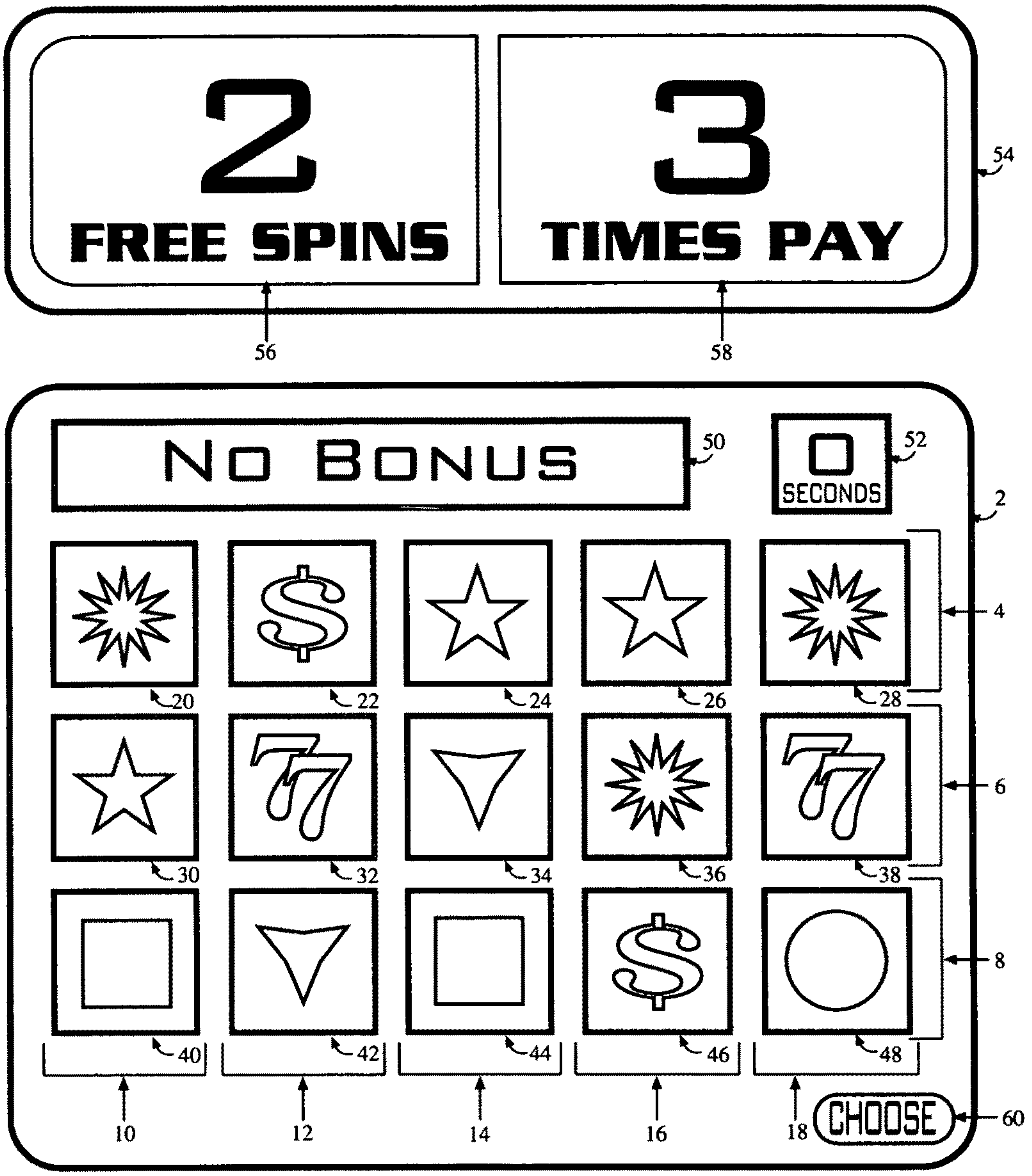
FIG. 1 shows a monitor screen of a slot machine with the results of a wagered spin according to the teachings in FIG. 1.

Electromechanical reels or a video monitor screen controlled by a processor in a gaming apparatus are disclosed on which symbols may be provided for use in a slot, video poker, bingo, keno or any other gambling machine games. The present invention describes a method and apparatus of wagered slot gameplay for individual or networked gaming machines that provide a base game, a time-based bonus element scheme that provides the parameters of a bonus event, and a time-based window of opportunity in which the bonus element scheme may be accepted by a qualified player. The base game comprises any video gaming play, and especially symbols that may be positioned in a grid, preferably as a matrix of rows and columns, or may be positioned in other symmetric, asymmetric or random patterns or shapes. A bonus element screen is preferably displayed on a screen separate from the base game (although the same screen including a picture-in-picture framing may be used), being located on either an area of each single machine or above a bank of community gaming machines. Alternately, the bonus element screen may be disposed on a separate area of the base game screen. The bonus element screen provides at least one but preferably at least two bonus elements (i.e., cash, credits, casino player points, free spins, multipliers, and the like) that are each constantly displayed and changeable according to a time interval. Each bonus element is available for random or predetermined time intervals, and changes when its time interval has decremented in real time to zero seconds. For example, the bonus element screen may display two distinct elements: a specific amount or number of free spins at a set wagered value, and a specific multiplier. Six free spins may be offered and displayed for 5 seconds; simultaneously a 3× multiplier may be offered and displayed for 15 seconds. Both displays decrement in real time, so that after 5 seconds (or whatever time interval is predetermined), the 6 free spins offer will expire, and be replaced by a new amount of free spins, for instance 2 free spins, that may be offered and displayed for 20 seconds. At this same point, the 3× multiplier is still available for 10 seconds. Each separate element may continue to decrement in real time until the time decrements to zero, at which point that element expires and is replaced by a new offer/display. When an element expires, it may be replaced by a similar offer/display (i.e., a 7× multiplier may become a 10× multiplier), or alternately, the new offer/display may be a different element (i.e., a 7× multiplier may become an offer of 1000 credits). Each element's availability is time-based, with the time frame being specific (i.e., each element is available for 20 seconds) or random (i.e., an element may be available for 5 seconds, 10 seconds, or 25 seconds, etc.). The time frame for each element's availability may or may not be shown to the player. A player may select either a previously displayed bonus, or may be limited to selection of a displayed bonus. There may be a limited number of displays, so that a player is required to select a bonus or the bonus event will entirely disappear (a total bonus expiry event). After the player has selected a bonus in a total bonus expiry event, the entire range of bonuses may be displayed automatically or upon player request so that the player can see if the best bonus had been selected, what bonus he may have rather chosen, or see how closely the expiry was approaching.

Preferably upon a triggering mechanism in the base game (although alternately upon a random event), the player qualifies for a time-based opportunity that affords a specific period of time in which to choose individual bonus element schemes from a flow of time-limited displays of bonus element schemes. Selection of a particular bonus element scheme may be made by the player hitting a "CHOOSE", "SELECT" or "PLAY" touchscreen or button function, or when a complete series of bonus element schemes has been exhausted, by default to the last scheme. Triggering mechanisms may include predetermined symbols, predetermined symbols on a predetermined payline, scatter pays, and the like. The time-based opportunity may be a specific or random amount of time. For example, if the player achieves a triggering mechanism in the base game, he may automatically receive 30 seconds in which to choose a bonus element scheme. Alternately, the triggering mechanism may provide a random amount of time, which may add more excitement and anticipation to the gameplay.

As soon as the time-based opportunity is triggered, the amount of time provided is displayed in an indicator window on or adjacent to the monitor screen, and immediately begins to decrement in real time. By reducing the time, greater excitement can be added to the player while reducing "dead" time of play on the machine. It may be most exciting to have each successive available selection have a different time amount than at least the preceding scheme, and most exciting if at least some successive schemes that can be selected have less time than previous selections. Before the amount of time decrements to zero, the player is afforded the chance to choose an available bonus element scheme. The player may choose the first available scheme, or wait until a more lucrative scheme may be offered. By waiting, however, the player risks ending up with a meager bonus element scheme. If the time in the time-based opportunity decrements to zero, the player is automatically afforded the bonus element scheme currently displayed or may even lose the bonus event completely, as described above in a total bonus expiry event. The total bonus expiry event can reduce dead time by having a player select earlier in the process to avoid complete loss of the bonus. The number of bonus schemes from which selection may be made may be predetermined and identified in non-expiry events and may vary from game to game, or differ with different trigger events, or differ randomly. It is particularly desirable in a total bonus expiry event to have the number of available schemes kept hidden and to have the number of available schemes randomly change.

For example, let's say the player still has a time-based opportunity of 25 seconds in which to choose a bonus element scheme. A bonus element scheme of 3 free spins at 2× pay is currently displayed, which the player rejects. With 16 seconds left in which to choose, the amount of free spins changes to 10 free spins. The player may actually scroll (preferably forward only) through optional bonus schemes if a particular bonus scheme is thought undesirable, and the player wants to preserve time to think. For example, a player may be given 25 total seconds to select, see a first scheme, feel that first screen is insufficient and hit an ADVANCE key or icon and immediately move to a next available scheme. This process may be done for the entire 25 seconds. The player may still reject the offer, hoping that the multiplier will also increase. With 4 seconds left in which to choose, the multiplier changes to 5× pay! As quickly as possible, the player presses a Choose button disposed on the monitor screen or machine itself. This locks in the bonus element scheme at 10 free spins at 5× pay, and the free spins/multiplier bonus round is immediately activated. Before the player begins playing the 1st free spin of the 10 free spins, the time indicator window changes to display the 5× multiplier for the free spins. The bonus round continues until all 10 free spins have been played and all wins have been multiplied by 5.

Reference to the Figures will assist in further understanding of the practice of the present invention.

FIG. 1 shows a slot machine monitor screen 2 with the result of a completed first spin after the player has wagered to play the base game. Fifteen individual symbol boxes (20, 22, 24, 26, 28, 30, 32, 34, 36, 38, 40, 42, 44, 46, 48) are arranged in a three-row (4, 6, 8) by five-column (10, 12, 14, 16, 18) matrix. A message box 50 indicates to the player that no bonus round opportunity has occurred. A time-based bonus indicator window 52 shows that no seconds are available since no bonus opportunity has occurred. A separate bonus screen (either incorporated as part of the slot machine monitor screen or as a separate top box display) 54 is also shown, displaying a first area depicting an amount of free spins 56 and second area depicting a multiplier 58, comprising the bonus elements for a bonus round. The amount of free spins and the amount of the multiplier may independently change based on a random time period that decrements in real time and that is unknown to the player. A choose button 60 is shown that may be operated by the player to signal the processor to accept the bonus element scheme and activate the free spins/multiplier bonus round.

Figure 2:
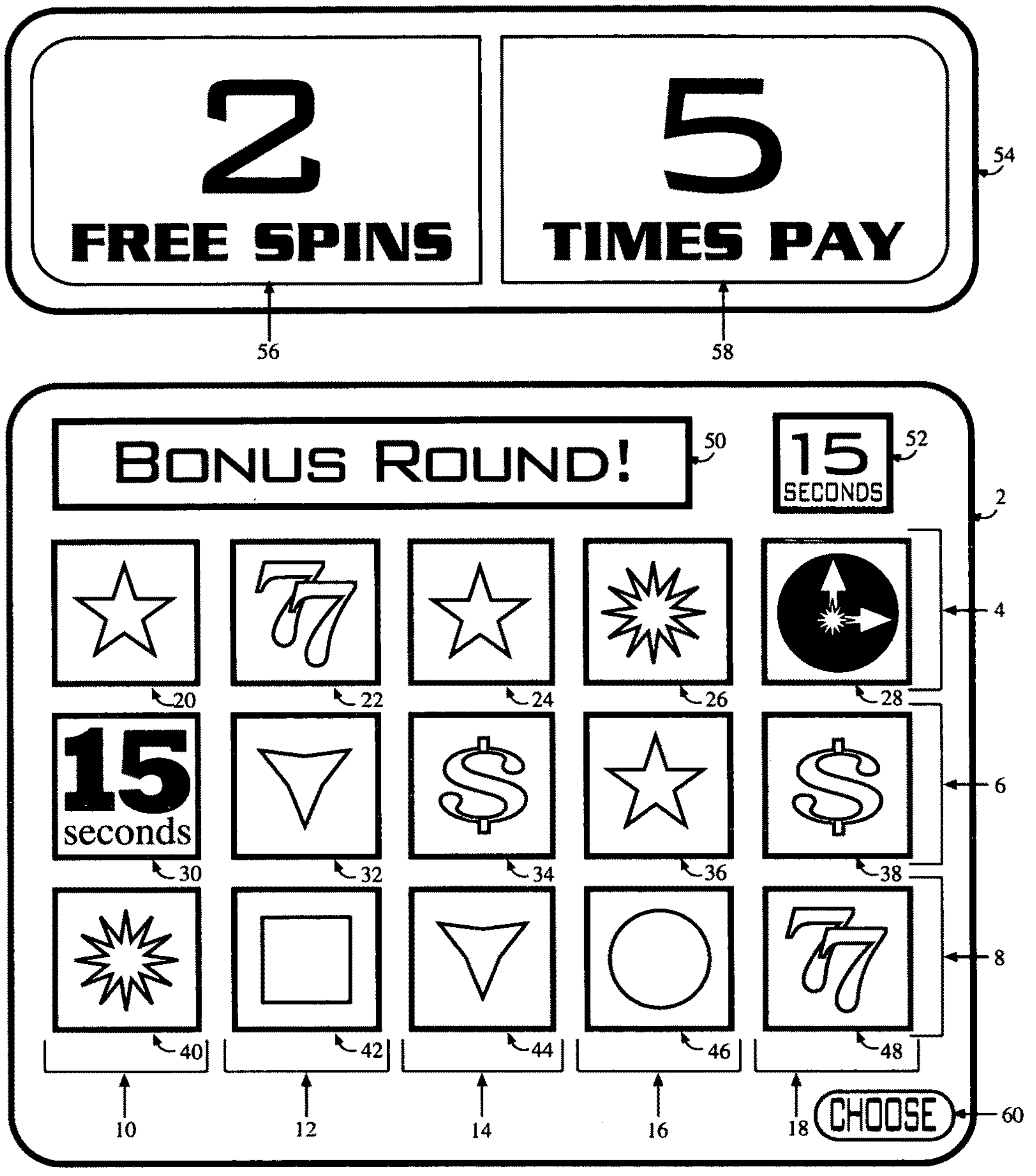
FIG. 2 shows the same game at a later stage.

FIG. 2 refers to the game elements shown in FIG. 1 wherein the amount of free spins 56 has remained the same, and the amount of the multipier 58 has randomly changed from 3× pay to 5× pay after the 3× pay time period has decremented to zero seconds. The slot machine monitor screen 2 now shows the result of a completed second spin. In this result, there are no payline wins (as commonly known in prior art of multiline slot games) among the fifteen individual symbol boxes (20, 22, 24, 26, 28, 30, 32, 34, 36, 38, 40, 42, 44, 46, 48), but a bonus opportunity has occurred. In this example, the bonus opportunity is triggered by a first special symbol appearing in the first reel column (a specific amount of time as shown in symbol box 30) and a second special symbol appearing in the fifth reel column (a clock symbol as shown in symbol box 28). The message box 50 indicates to the player that a bonus opportunity has occurred, and that the time available for the bonus opportunity is 15 seconds, as indicated in the time-based bonus indicator window 52. The time indicated in the time-based bonus indicator window will immediately, or almost immediately, begin to decrement, until the player either picks the choose button 60 to signal the processor to activate the free spins/multiplier bonus round or until the time indicator window 52 has no seconds left. In this example, the player is not satisfied with only 2 free spins at 5× pay, and so does not activate the choose button 60.

Figure 3:
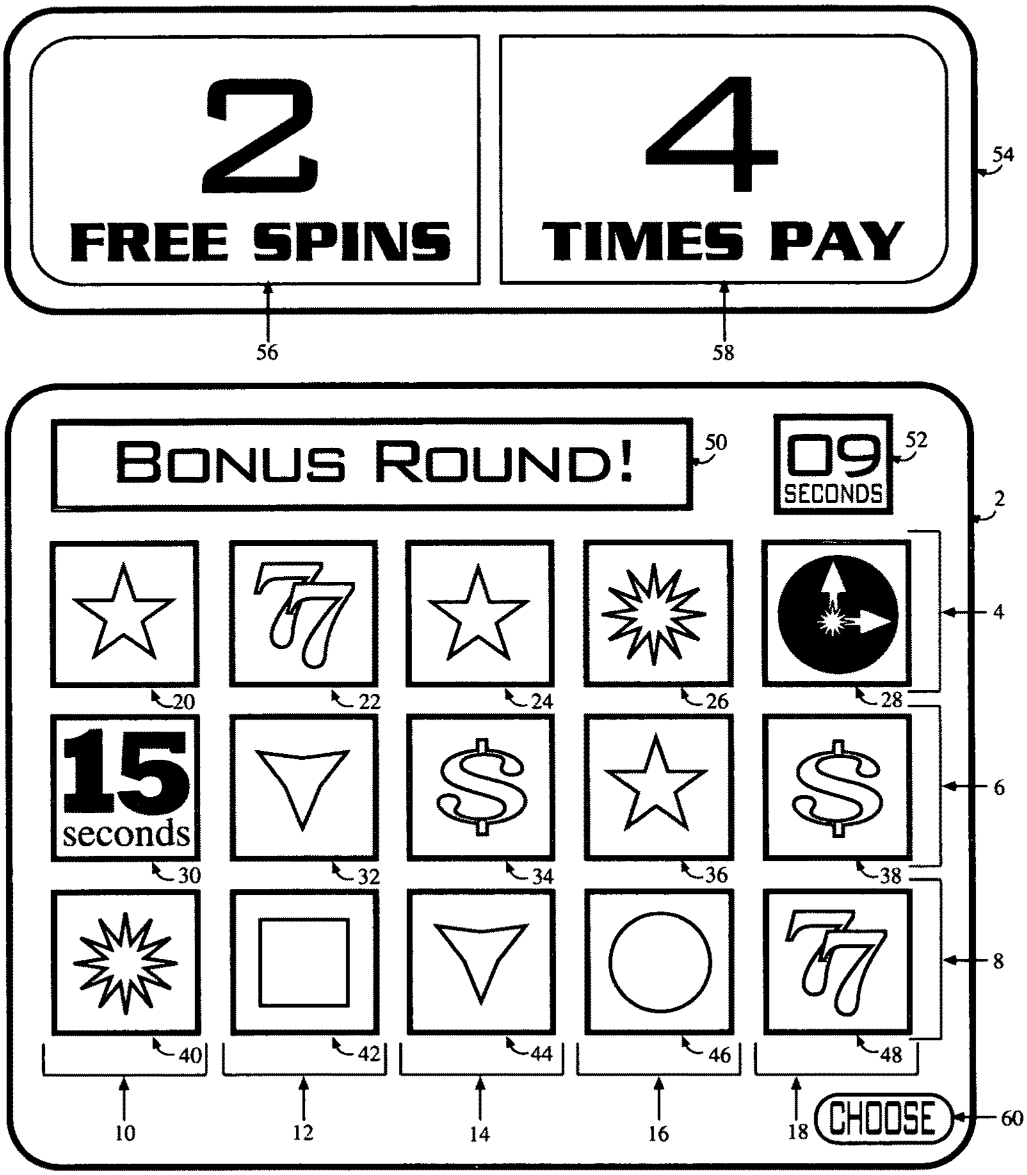
FIG. 3 shows the same game at a later stage.

FIG. 3 refers to the game elements shown in FIG. 2 wherein the amount of free spins 56 has remained the same, and the amount of the multipier 58 has randomly changed from 5× pay to 4× pay with 9 seconds left in the time indicator window 52. The player decides to keep waiting for a better result, and again does not activate the choose button 60.

Figure 4:
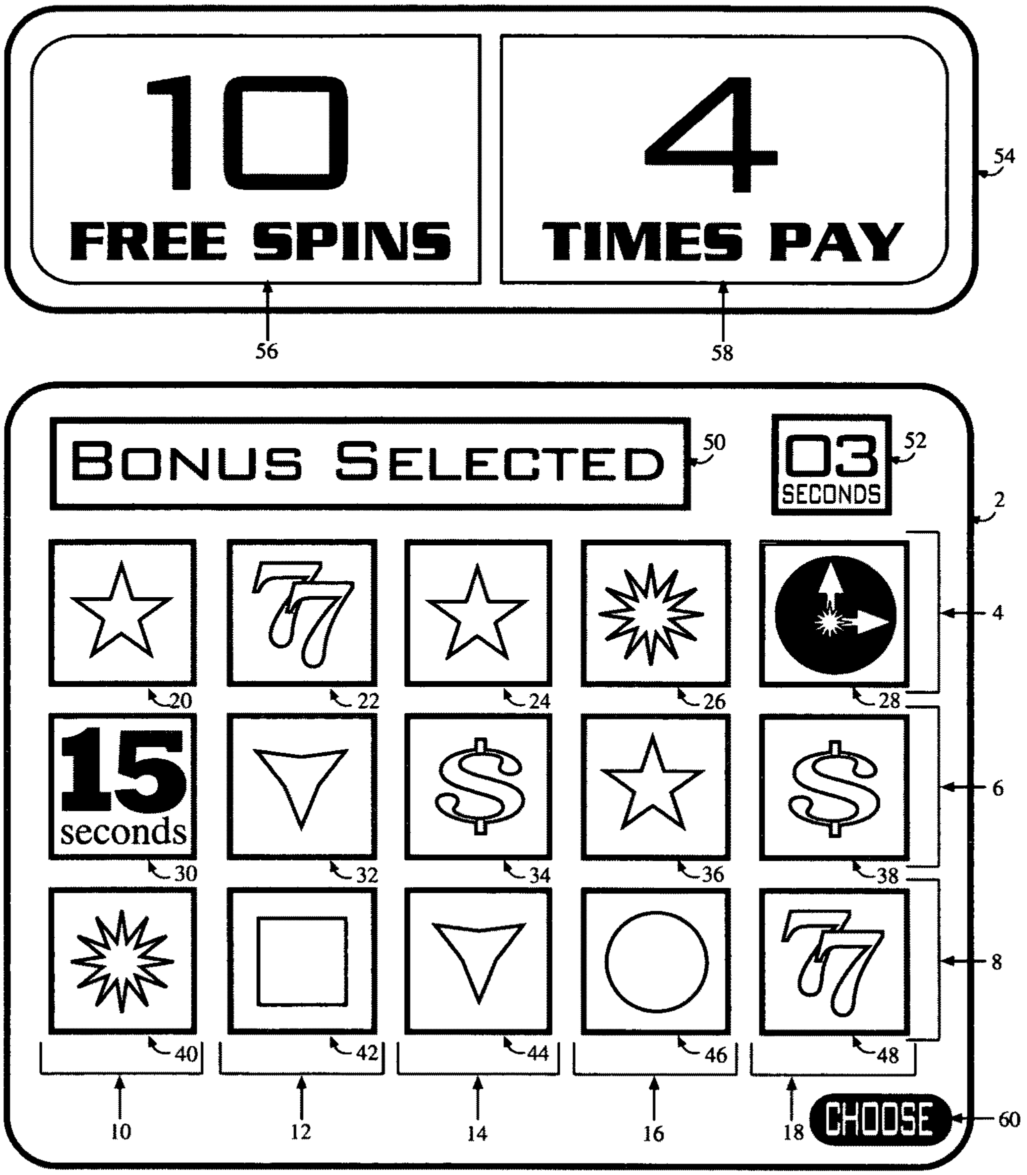
FIG. 4 shows the same game at a later stage.

FIG. 4 refers to the game elements shown in FIG. 3 wherein the number of free spins 56 has randomly changed from 2 free spins to 10 free spins, and the amount of the multiplier 58 has remained at 4× pay with 3 seconds left in the time indicator window 52. This is an exciting outcome, so the player presses the choose button 60 (as shown in black) to lock in the outcome. The message box now indicates that those free spin/multiplier parameters (10 free spins at 4× pay) have been selected.

Figure 5:
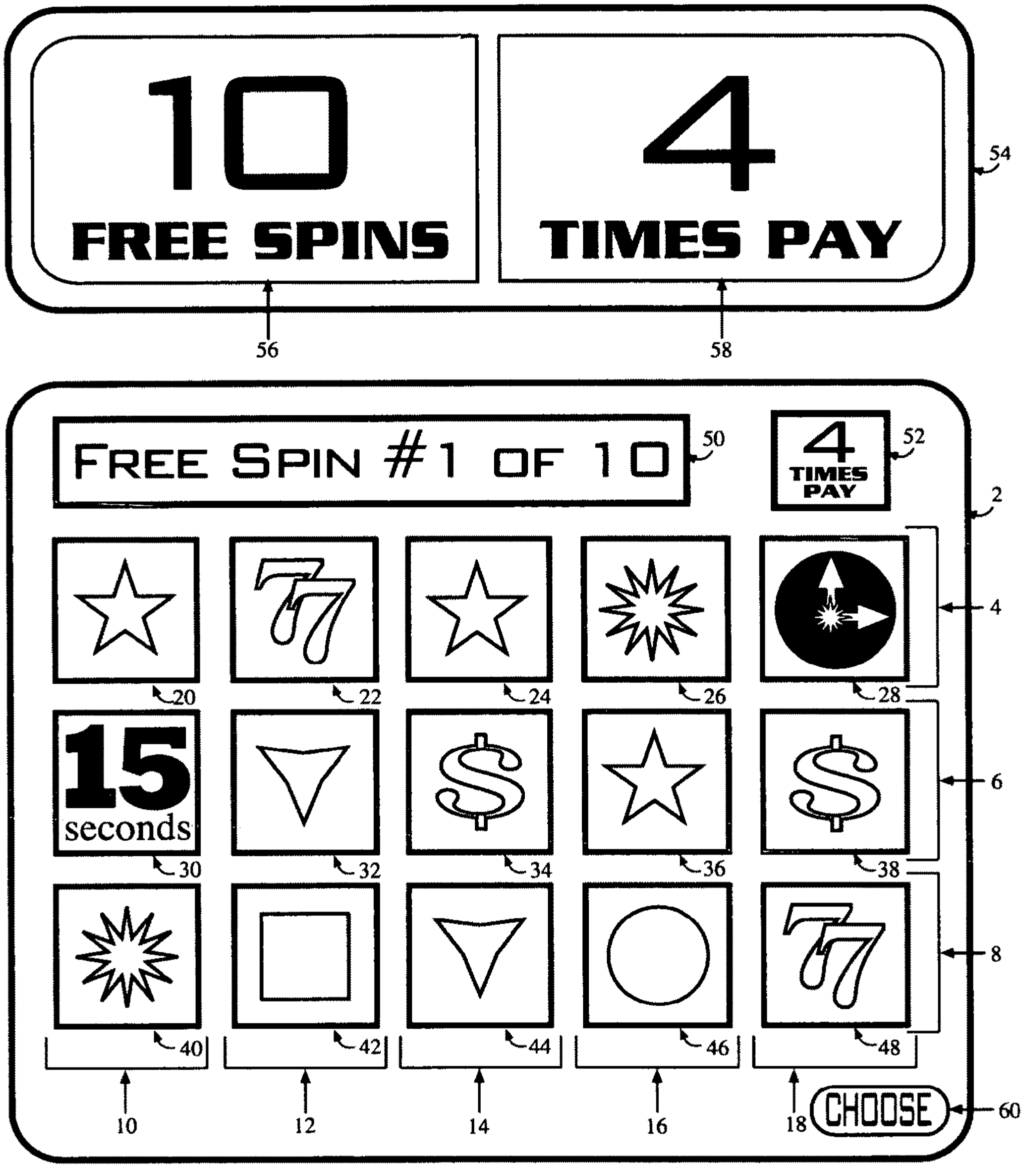
FIG. 5 shows the same game at a final stage.

FIG. 5 refers to the game elements shown in FIG. 4, with the message box now indicating that the player is playing the 1st free spin of 10 free spins, and the time indicator window changing to display the 4× multiplier for the free spins. The bonus round continues until all 10 free spins have been played and all wins have been multiplied by 4.

Figure 6:
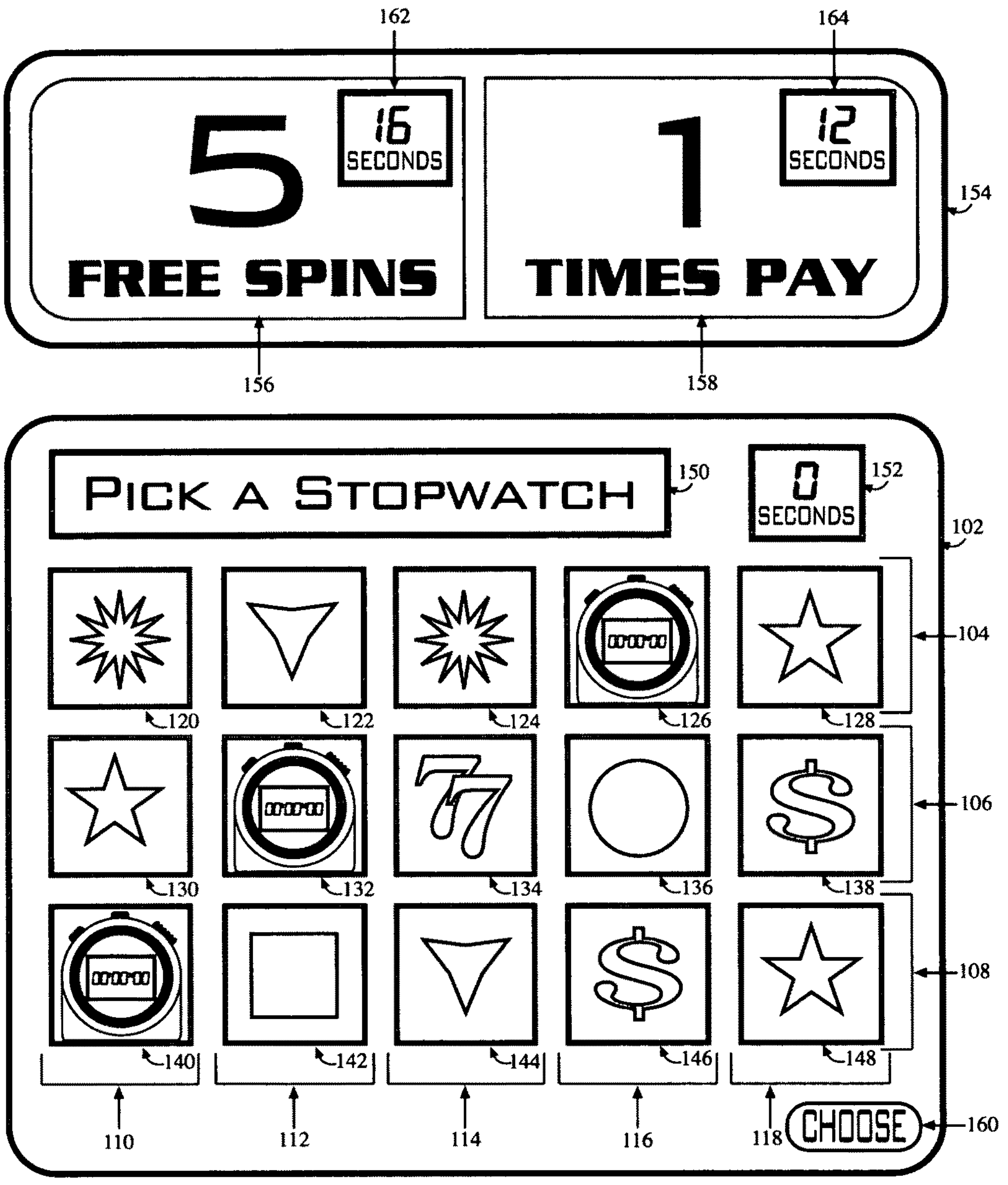
FIG. 6 shows a monitor screen of a slot machine with a result of a wagered spin according to an alternate teaching of the present invention.

FIG. 6 illustrates a second methodology of the present invention and shows a slot machine monitor screen 102 with the result of a completed first spin after the player has wagered to play the base game. Fifteen individual symbol boxes (120, 122, 124, 126, 128, 130, 132, 134, 136, 138, 140, 142, 144, 146, 148) are arranged in a three-row (14, 16, 18) by five-column (110, 112, 114, 116, 118) matrix. A message box 150 indicates to the player that a bonus round opportunity has been triggered by spinning a slot game result that includes three scatter pay stopwatch symbols (140, 132, 126), and the player is prompted to pick one of the scatter stopwatch symbols. A predetermined time period may be imposed in which the player may pick one of the scatter pay symbols, with the processor randomly choosing one of the scatter pay symbols if the player does not make a choice within the predetermined time period. A time-based bonus indicator window 152 shows that no seconds are as yet available. A separate bonus screen (either incorporated as part of the slot machine monitor screen or as a separate top box display) 154 is also shown, displaying a first area depicting a number of free spins 156 and second area depicting a multiplier 158, comprising the bonus elements for a bonus round. The amount of free spins and the amount of the multiplier may independently change based on either a random or specific time period that is indicated to the player via timer windows 162 and 164. A choose button 160 is shown that may be operated by the player to signal the processor to accept the bonus element scheme and activate the free spins/multiplier bonus round.

Figure 7:
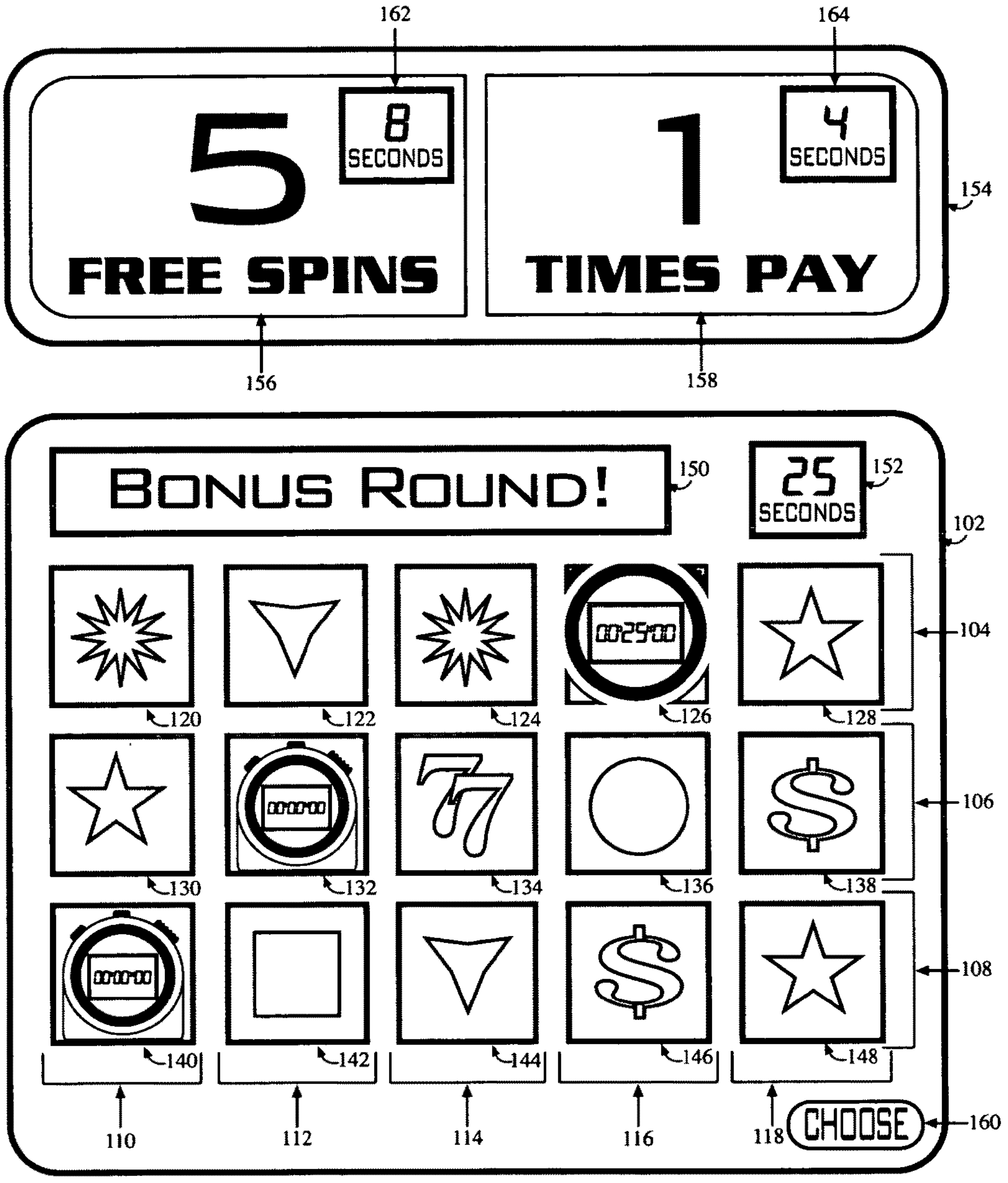
FIG. 7 shows the game of FIG. 6 at a later stage.

FIG. 7 refers to the game elements shown in FIG. 6 with the player picking the stopwatch symbol in symbol box area 126. A time of 25 seconds on the enlarged symbol is revealed, and shown in the time indicator window 152. It has taken the player 8 seconds to pick that particular symbol, and those 8 seconds have been decremented from timer windows 162 and 164. Upon picking the symbol, the message box 150 indicates to the player that he has won the bonus round opportunity, which starts the time indicator window 152 decrementing.

Figure 8:
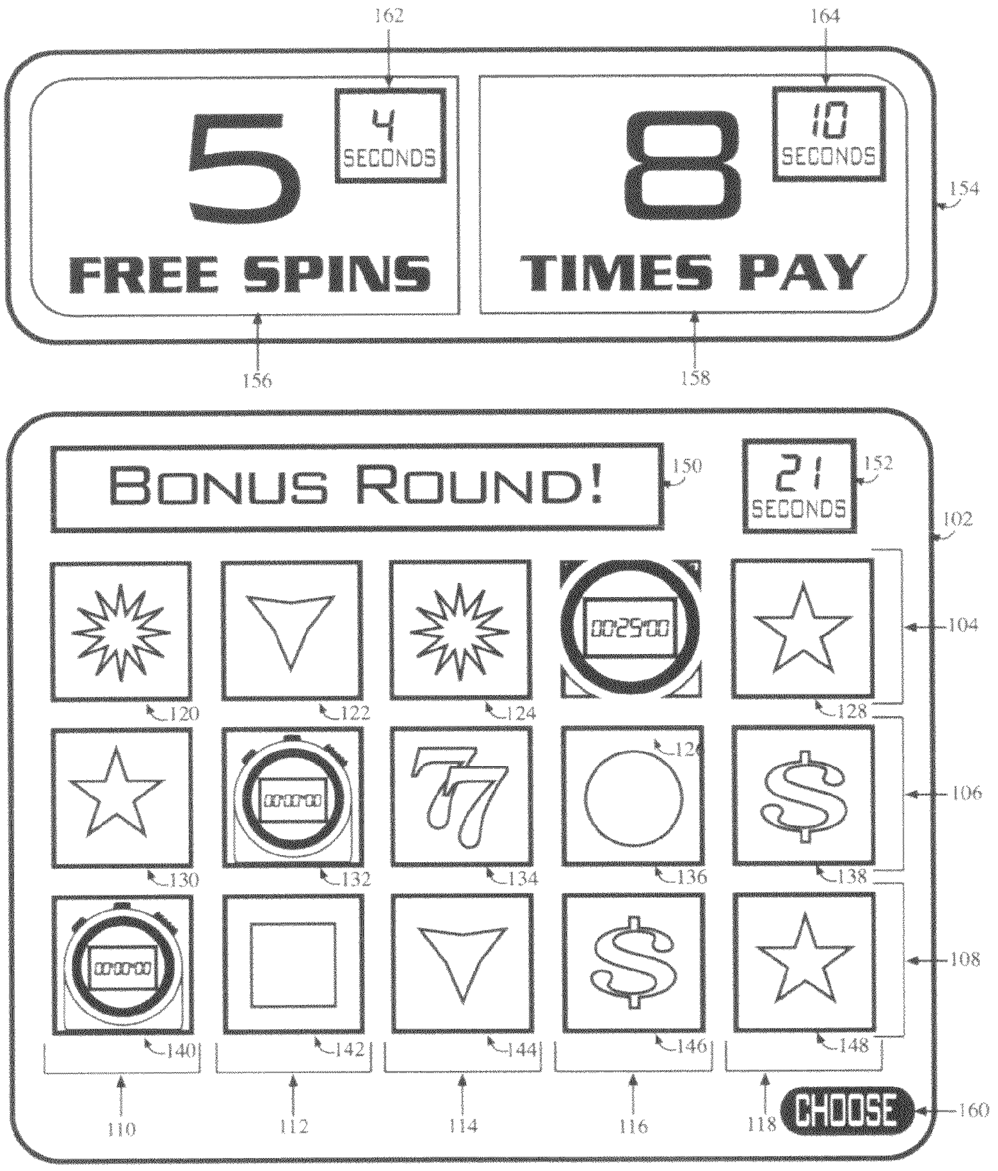
FIG. 8 shows the game of FIG. 7 at a later stage.

FIG. 8 refers to the game elements shown in FIG. 7 with 4 seconds elapsing so that now the 5 free spins 156 are available for 4 seconds 162, and the multiplier 158 has changed to 8× pay after the 1× pay element timer decremented to zero seconds. The 8× pay element is shown to be available for 10 seconds 164. At this moment, with 21 seconds left in the time indicator window 152, the player picks the choose button (as shown in black) to lock in those free spins/multiplier parameters and activate the free spins/multiplier bonus round.

Figure 9:
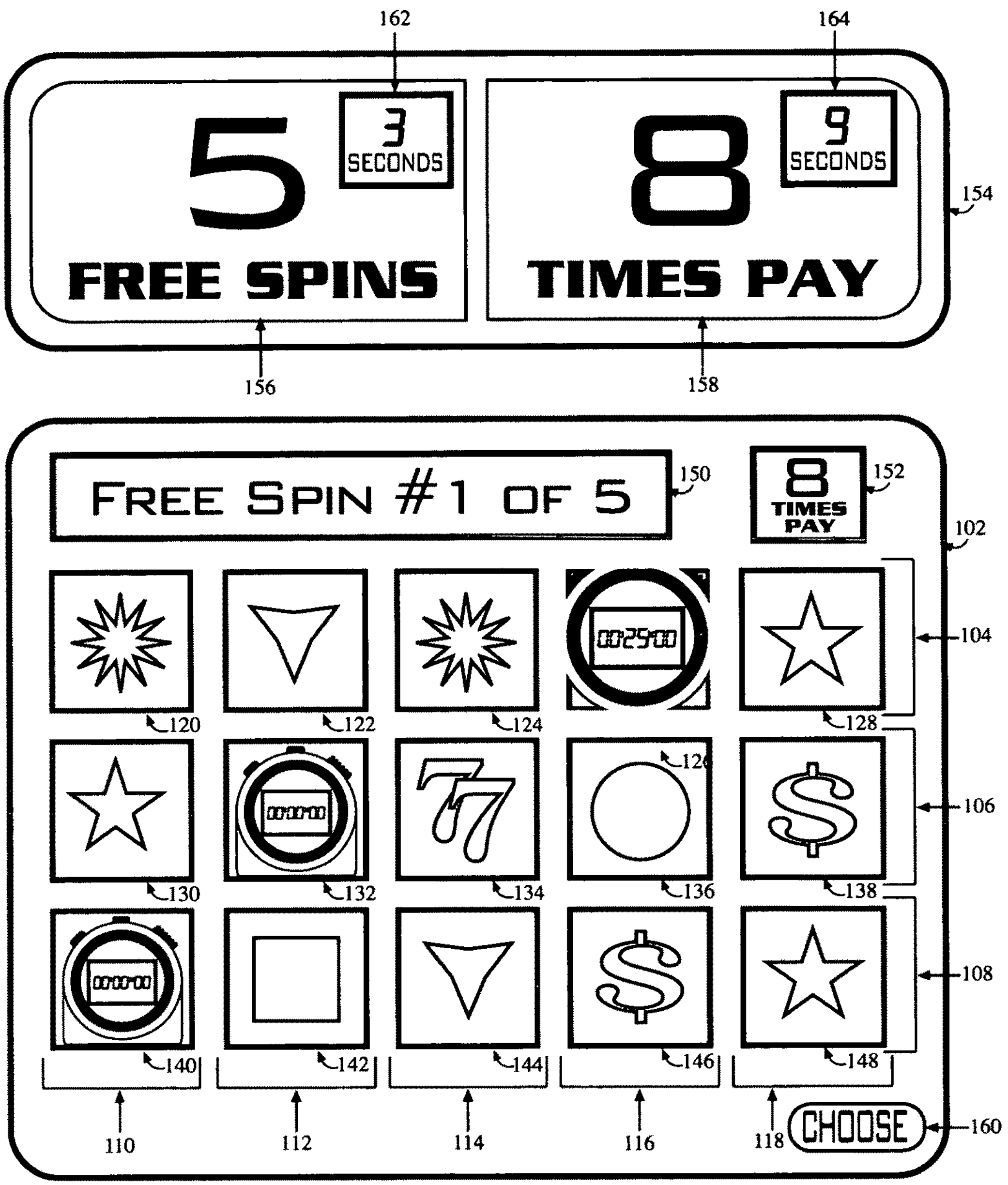
FIG. 9 shows the game of FIG. 8 at a final stage.

FIG. 9 refers to the game elements shown in FIG. 8 with 1 second elapsing so that now the 5 free spins 156 are available for 3 seconds 162, and the multiplier 158 remains at 8× pay available for 9 seconds 164. The message box now indicates that the player is playing the 1st free spin of 5 free spins, as the time indicator window changes to display the 8× multiplier for the free spins. The bonus round continues until all 5 free spins have been played and all wins have been multiplied by 8.

In a preferred embodiment of the present invention, let's say the player gets 45 seconds in which to accept the bonus element scheme, and the current display shows 2 free spins and a 2× multiplier. That's not very lucrative, so the player waits until one of the elements changes. After 30 seconds (having 15 seconds left in which to accept), the free spins has decremented to zero and changes to 10 free spins. Now the player must decide. Should he risk this better outcome by not accepting (who knows: the free spins may again change to only 3 free spins, for example, or the bonus elements may change completely: the 2× multiplier may become a bonus award of only 50 credits, for example) and waiting for something better? The player waits, and with 6 seconds to go, the multiplier changes to 8× pay. The player hits the Choose button to lock in the result: 10 free spins at 8× pay. Immediately after the accepted designation of a scheme, the bonus event starts.

Although specific examples and specific images have been provided in this discussion, these specifics are intended to be only support for the generic concepts of the invention and are not intended to be absolute limits in the scope of the technology discussed.

What is claimed:

1. A method of game play on a gaming system and apparatus comprising a mechanical or video display, player input system and a processor configured to perform, in the following order, firstly an underlying game, secondly a time-based bonus opportunity event, and thirdly a resolvable bonus game event, the method comprising:

a) the processor recognizing from the player input system wagering of an amount on an underlying wagering game;

b) the underlying wagering game having a trigger event that enables a time-based bonus opportunity event;

c) upon triggering the time-based bonus opportunity event, the processor allowing a set time within which a selection of a time-based bonus element scheme may occur, and in which any awards accrued to the wagering of the amount at the player input system in the underlying game are credited to the player input system at this time or at the conclusion of any bonus game event played at the player input system;

d) within that said set time, a first bonus element scheme is provided to the player input system and the processor recognizes selection or declining at the player input system of the first bonus element scheme;

e) upon selection of the first bonus element scheme, that bonus element scheme is then utilized to determine the parameters of a subsequent resolvable bonus game event, and upon declining the first bonus element scheme, a second bonus element scheme is provided by the processor to the player input system and the processor recognizes selection or declining at the player input system of the second bonus element scheme within any remaining amount of the set time;

f) if the processor has not recognized selection of a bonus element scheme at the player input system upon expiry of the set time, the processor will either provide a default bonus element scheme or end the time-based bonus without providing any bonus element scheme to the player input system; and g) after play of the subsequent resolvable bonus game event, any bonus awards at the player input system are resolved by the processor.

2. The method of claim 1 wherein the processor provided set time is provided as equal time intervals for selection of each bonus element scheme.

3. The method of claim 1 wherein the processor provides different time intervals for selection of at least two different bonus element schemes.

4. A method of game play on a gaming system and apparatus comprising a mechanical or video display, player input system and a processor configured to perform, in the following order, firstly an underlying game, secondly a time-based bonus opportunity event, and thirdly a resolvable bonus game event, the method comprising:

a) the processor recognizing from the player input system wagering of an amount on an underlying wagering game;

b) the underlying wagering game having a trigger event that enables a time-based bonus opportunity event;

c) upon triggering the time-based bonus opportunity event, the processor allowing a set time within which a selection of a time-based bonus element scheme may occur, and in which any awards accrued to the wagering of the amount at the player input system in the underlying game are credited to the player input system at this time or at the conclusion of any bonus game event played at the player input system;

d) within that said set time, a first bonus element scheme is provided to the player input system and the processor recognizes selection or declining at the player input system of the first bonus element scheme;

e) upon selection of the first bonus element scheme, that bonus element scheme is then utilized to determine the parameters of a subsequent resolvable bonus game event, and upon declining the first bonus element scheme, a second bonus element scheme is provided by the processor to the player input system and the processor recognizes selection or declining at the player input system of the second bonus element scheme within any remaining amount of the set time;

f) if the processor has not recognized selection of a bonus element scheme at the player input system upon expiry of the set time, the processor will either provide a default bonus element scheme or end the time-based bonus without providing any bonus element scheme to the player input system;

g) after play the subsequent resolvable bonus game event, any bonus awards at the player input system are resolved by the processor; and h) wherein the processor provides a random number of bonus element schemes for selection within time intervals and when a total time period has expired for the random number of bonus element schemes, a default bonus element scheme is provided by the processor for the subsequent resolvable bonus game event, and then the subsequent resolvable bonus game event is provided, using the default bonus scheme.

5. The method of claim 4 wherein the processor provided set time is provided by the processor as equal time intervals for selection of each bonus element scheme.

6. The method of claim 4 wherein the processor provides different time intervals for selection of at least two different bonus element schemes.

* * * * *